United States Patent [19]

Takashima et al.

[11] Patent Number: 5,245,651
[45] Date of Patent: Sep. 14, 1993

[54] COMMUNICATION APPARATUS FOR STORING ABANDONED CALL INFORMATION

[75] Inventors: Shoichi Takashima, Tokyo; Takuji Nakatsuma, Machida, both of Japan

[73] Assignee: Canon Kabushiki Kaisha, Tokyo, Japan

[21] Appl. No.: 779,159

[22] Filed: Oct. 21, 1991

Related U.S. Application Data

[63] Continuation of Ser. No. 393,887, Aug. 15, 1989, abandoned.

[30] Foreign Application Priority Data

| Aug. 22, 1988 | [JP] | Japan | 63-206296 |
| Aug. 22, 1988 | [JP] | Japan | 63-206297 |
| Aug. 24, 1988 | [JP] | Japan | 63-208275 |
| Nov. 28, 1988 | [JP] | Japan | 63-298286 |
| Nov. 28, 1988 | [JP] | Japan | 63-298287 |

[51] Int. Cl.⁵ ............................................. H04M 11/00
[52] U.S. Cl. ....................................... 379/96; 379/142; 379/100; 379/94
[58] Field of Search ............ 379/142, 215, 201, 209, 379/246, 247, 93, 94, 100, 130, 88, 127, 139

[56] References Cited

U.S. PATENT DOCUMENTS

| 3,560,658 | 2/1971 | Molloy et al. | 379/235 |
| 3,904,830 | 9/1975 | Every, Sr. et al. | 379/247 |
| 4,304,968 | 12/1981 | Klausner et al. | 379/142 |
| 4,582,956 | 4/1986 | Doughty | 379/142 |
| 4,873,719 | 10/1989 | Reese | 379/142 |
| 4,924,491 | 5/1990 | Compton et al. | 379/201 |
| 4,924,496 | 5/1990 | Figa et al. | 379/131 |

FOREIGN PATENT DOCUMENTS

| 0154865 | 9/1984 | Japan | 379/201 |
| 0089846 | 4/1989 | Japan | 379/142 |

OTHER PUBLICATIONS

Philips Telecommunication Review, vol. 45, No. 3, pp. 35-41, Sep. 1987 (Hesdahl).
"Voice and Data Workstations and Services in the ISDN", Eriksson et al. *Ericsson Review*, May 1984, pp. 14-19.
"The Messaging Telephone in the Integrated Office", Peter Zinsli, *Telecommunications*, Sep. 1984, pp. 74, 80.

Primary Examiner—James L. Dwyer
Assistant Examiner—Stella L. Woo
Attorney, Agent, or Firm—Fitzpatrick, Cella, Harper & Scinto

[57] ABSTRACT

A communication apparatus includes a reception unit for receiving discrimination information for discriminating a calling party terminal equipment; a memory for storing the information received by the reception unit if no response is made to the call reception; and an output unit for visually outputting the information stored in the memory. The communication apparatus may further include a counter for counting the number of call receptions for each calling party number stored in the memory; and a unit for notifying one of the count result by the counter. The communication apparatus may also include a unit for determining if a call reception from a communication network is to be responded to or not; and a unit for calling the calling party after the display by the display unit, in response to an entry of a predetermined key.

18 Claims, 16 Drawing Sheets

FIG. 17

| | | |
|---|---|---|
| 151 | 7 5 8 2 1 1 1 | 1 — 157 |
| 152 | 7 5 7 6 2 4 2 | 3 — 158 |
| 153 | VACANT | 0 — 159 |
| 154 | VACANT | 0 — 160 |
| 155 | VACANT | 0 — 161 |
| 156 | VACANT | 0 — 162 |

| 7582111 | NAKAMURA |
|---|---|
| 7576242 | YAMAMOTO |
| 7581234 | MATSUMOTO |
| | |

FIG. 20

111-1—○ NAKAMURA -------- ○—111-4
111-2—○ YAMAMOTO -------- ○—111-5
111-3—○ MATSUMOTO -------- ○—111-6

COMMUNICATION APPARATUS FOR STORING ABANDONED CALL INFORMATION

This application is a continuation of application Ser. No. 07/393,887 filed Aug. 15, 1989 now abandoned.

BACKBROUND OF THE INVENTION

1. Field of the Invention

The present invention relates to a communication apparatus such as a telephone set for speech communication, a facsimile apparatus for image data communication, and the like.

2. Related Background Art

With a telephone set connected to a conventional general public telephone network, the telephone number of a communication partner (or calling party) is not notified by the network so that the communication partner cannot be identified. Therefore, for example, if a called party is not present at the telephone set, the calling party cannot be identified.

If a care-taking telephone set for dealing with one's absence is used with a general public telephone network, this telephone set automatically responds to a call during one's absence and records a message from the communication partner, so that the call can be recognized by the called party by reproducing the message. If the communication partner has not left any message, then the called party cannot know if any call was initiated during the absence.

A telephone set connected to a conventional public telephone network has thus the following problems.

(1) A message is not recorded unless the telephone set automatically responds to the call. There is not provided means for knowing who is the communication partner prior to responding to the call.

(2) Even if a calling party can be identified and a call is made to the calling party at a later time, the telephone number of the calling party should be dialed to effect a connection to the calling party.

Integrated Services Digital Network (ISDN) has now been made widely used, which allows high speed and large capacity data transmission. In ISDN, one circuit is constructed of three communication channels, i.e., two data channels (B channel) and one control channel (D channel). A single circuit or line can connect eight terminal pieces of equipment at a maximum.

The call connection procedure and the like procedure at this circuit is performed using the control channel (D channel).

ISDN has a service for notifying a called party of the number of a communication partner. U.S. application Ser. No. 363,860 (filed on Jun. 9, 1989), discloses that by using this service, the name of a communication partner having its specific number is displayed upon reception of a call. However, conventionally, if a telephone set connected to ISDN does not respond to a call, the above display procedure is not effected, so that even if a call was made during one's absence, the called party cannot know if there was the call.

A facsimile apparatus for image data communication is also associated with such a problem. Namely, if there occurs a local error such as no recording sheet, a memory full-state or the like, the data transmitted from a communication partner to a called party after the call reception, cannot be received. In such a case, conventionally, the call reception is therefore rejected. Even if an operator knows of a local error after the call, the communication partner or calling party requested the call during the local error cannot be identified.

SUMMARY OF THE INVENTION

It is an object of the present invention to solve the above-described prior art technical problems and provide a communication apparatus capable of reliably identifying a calling party which made a call during the absence of a called party operator.

It is another object of the present invention to provide a communication apparatus capable of calling, with a simple manipulation, the communication partner which made a call during the absence of the called party.

It is a further object of the present invention to provide a communication apparatus capable of identifying the number of a communication partner which made a call during the called party absence and the number of call times, to thereby allow ready recognition of the degree of emergency of the calling party.

It is a still further object of the present invention to provide a communication apparatus capable of notifying one that there was a call during a local error of a terminal equipment, and notifying its one of the identity of the caller. It is another object of the present invention to provide a communication apparatus capable of displaying, with a simple manipulation, a plurality of communication partners which made calls during the called party's absence.

The above and other objects of the present invention will become apparent from the following detailed description when read in connection with the accompanying drawings.

BRIEF DESCRIPTION OF THE DRAWINGS

FIG. 17 shows a communication partner number table in RAM 103 of the fifth embodiment;

FIG. 18 shows a display example on a display unit of the fifth embodiment; and

FIGS. 19 and 20 show a table in RAM 103 and a display example on a display unit, which are a modification of the fourth embodiment.

DETAILED DESCRIPTION TO THE PREFERRED EMBODIMENTS

1st Embodiment

A first embodiment of the present invention will be described in detail with reference to the accompanying drawings. In this embodiment, a digital telephone set connected to ISDN is used as a communication terminal equipment by way of example.

Figure 1:
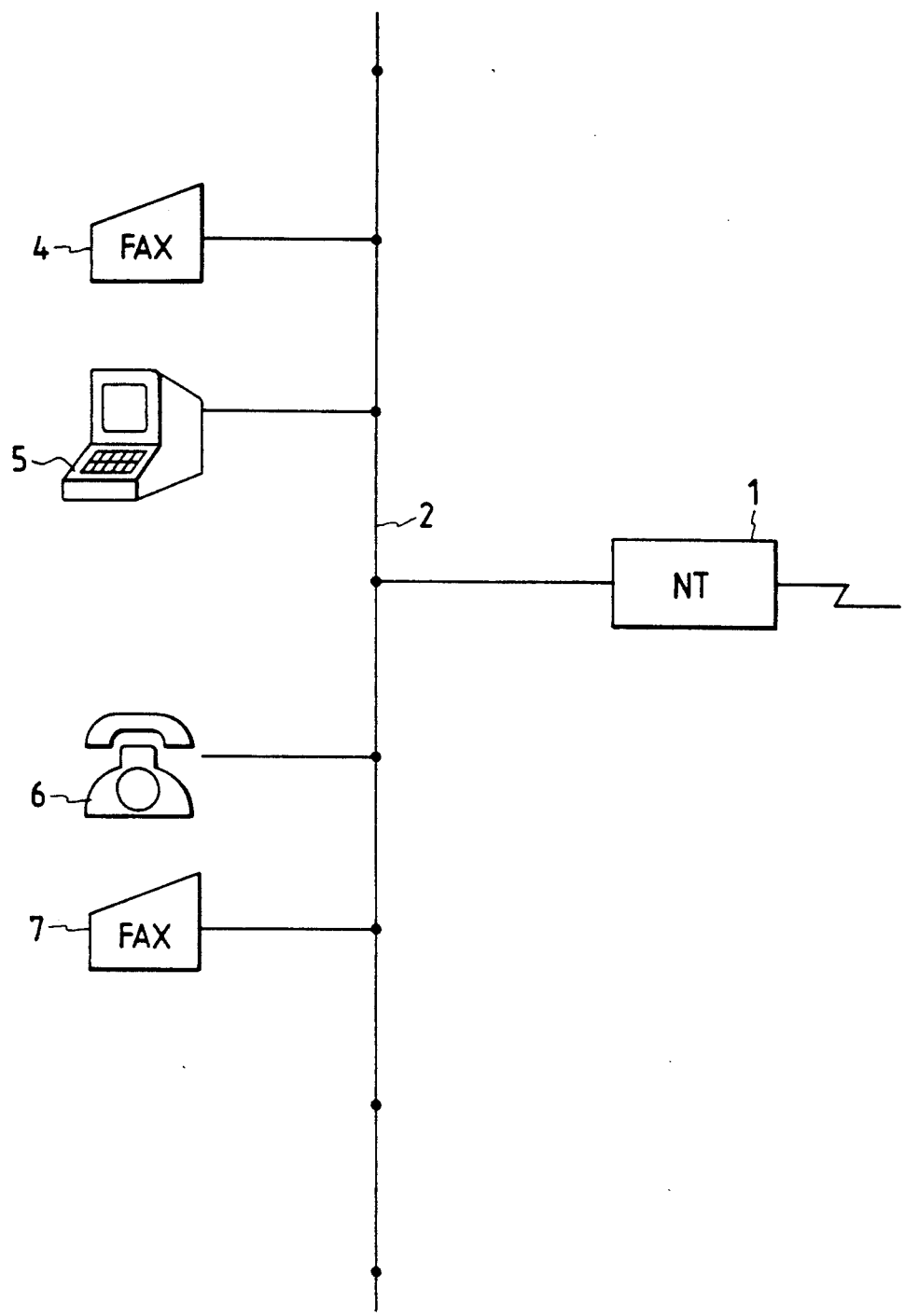
FIG. 1 is a connection diagram of a digital telephone set of first and second embodiments connected to ISDN.

FIG. 1 shows terminal equipments connected to ISDN. In FIG. 1, reference numeral 1 represents a network terminating unit, 2 denotes a bus for interconnecting the network terminating unit 1 and a plurality of terminal equipments, 4 and 7 denotes a facsimile apparatus, 5 denotes a telex terminal, 6 denotes a digital telephone set of the first embodiment.

Figure 2:
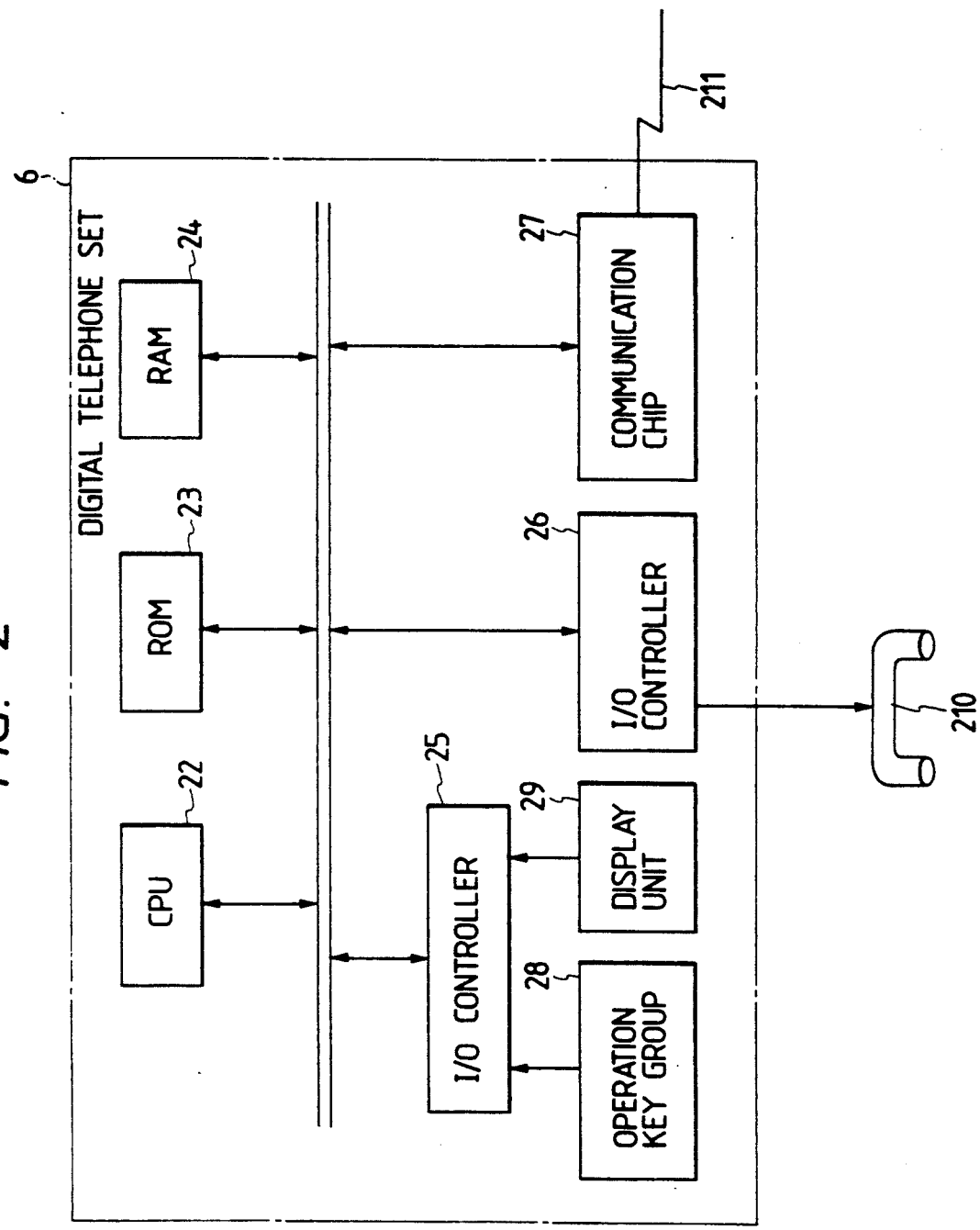
FIG. 2 is a block diagram showing the structure of the digital telephone set of the first and second embodiments.

FIG. 2 is a block diagram showing the structure of the digital telephone set 6. In FIG. 2, reference numeral 22 represents a CPU for controlling the terminal equipments, 23 denotes a ROM for storing programs for the operation processing procedure of CPU 22, and 24 denotes a RAM to be used as a working area by CPU 22. ROM 23 stores therein the programs associated with the flow charts shown in FIGS. 4 to 6 to be described later. An input/output (I/O) controller 25 controls the input of data upon depression of a key among an operation key (button) group 28, and the output of display data onto a display unit 29. An I/O controller 26 controls the input/output with respect to a handset 210, and a communication chip 27 controls the communication via an ISDN bus circuit 211.

Figure 3:
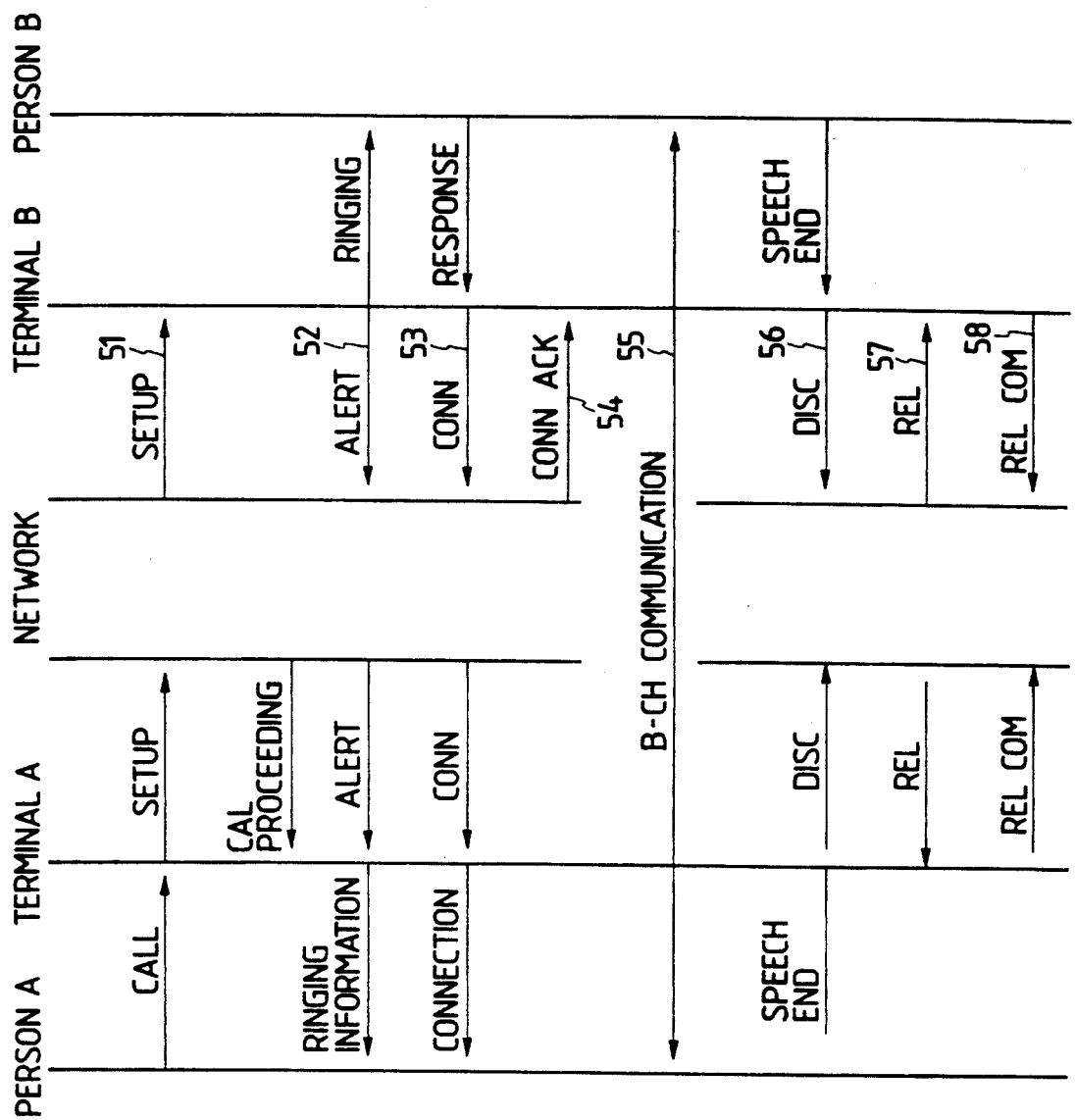
FIG. 3 is a diagram showing a call control sequence of the first to third embodiments.

FIG. 3 shows a D channel protocol upon call reception at the digital telephone set 6 of this embodiment constructed as above. The procedure executed by the telephone set will be described with reference to FIG. 4.

Upon reception of a call SETUP message from the network at step S2, a called party terminal equipment B checks at step S3 the integrity (or matching) whether the setup message is allowed to be received or not. If the judgement is affirmative, at the same step S3, an ALERT signal is returned to generate a sound at the calling party. Thereafter, a bell or the like is driven to start ringing at step S4.

Next, at step S6, it is checked if an operator has taken the handset 210 off the hook to respond to the call reception, and at step S7 it is checked if a call release message such as a DISConnection message is received from the network.

If an off-hook state of the handset 210 is detected, the control advances from step S6 to Step S11 whereat a CONNection signal is returned to perform an ordinary call processing, and thereafter at step S12 a speech communication starts. After completion of the speech, a circuit (or line) disconnection process is performed at step S9.

If a call release message such as a DISConnection message, a RELease message, or the like is received, the control advances from step S7 to step S8.

At step S8, a call release reason code contained in the call release message received at step S8 is picked up to check if the reason code indicates that "a disconnection or release from a user not selected". This code indicates that another terminal equipment connected to the same ISDN circuit has responded. Therefore, if the picked-up reason code indicates the other contents, it is judged that the call release message has been generated due to no response (absence of operator).

If it is judged as a call release due to no response, the control advances to step S13 to display a message (stored in ROM) indicative of a call reception during absence, on the display unit 29 via the I/O controller 25. At step S14, sub-address information contained in the SETUP message is picked up and stored in RAM 24 at a communication partner number area. Then, at step S9 a circuit disconnection process is carried out.

If NO in step S8, since it is judged that the other terminal responds, so that the processes in steps S13 and S14 are not carried out and the circuit disconnection process is carried out at step S9.

Next, the process to be executed by an operator returning to the terminal equipment will be described with reference to the flow chart shown in FIG. 5.

Figure 4:
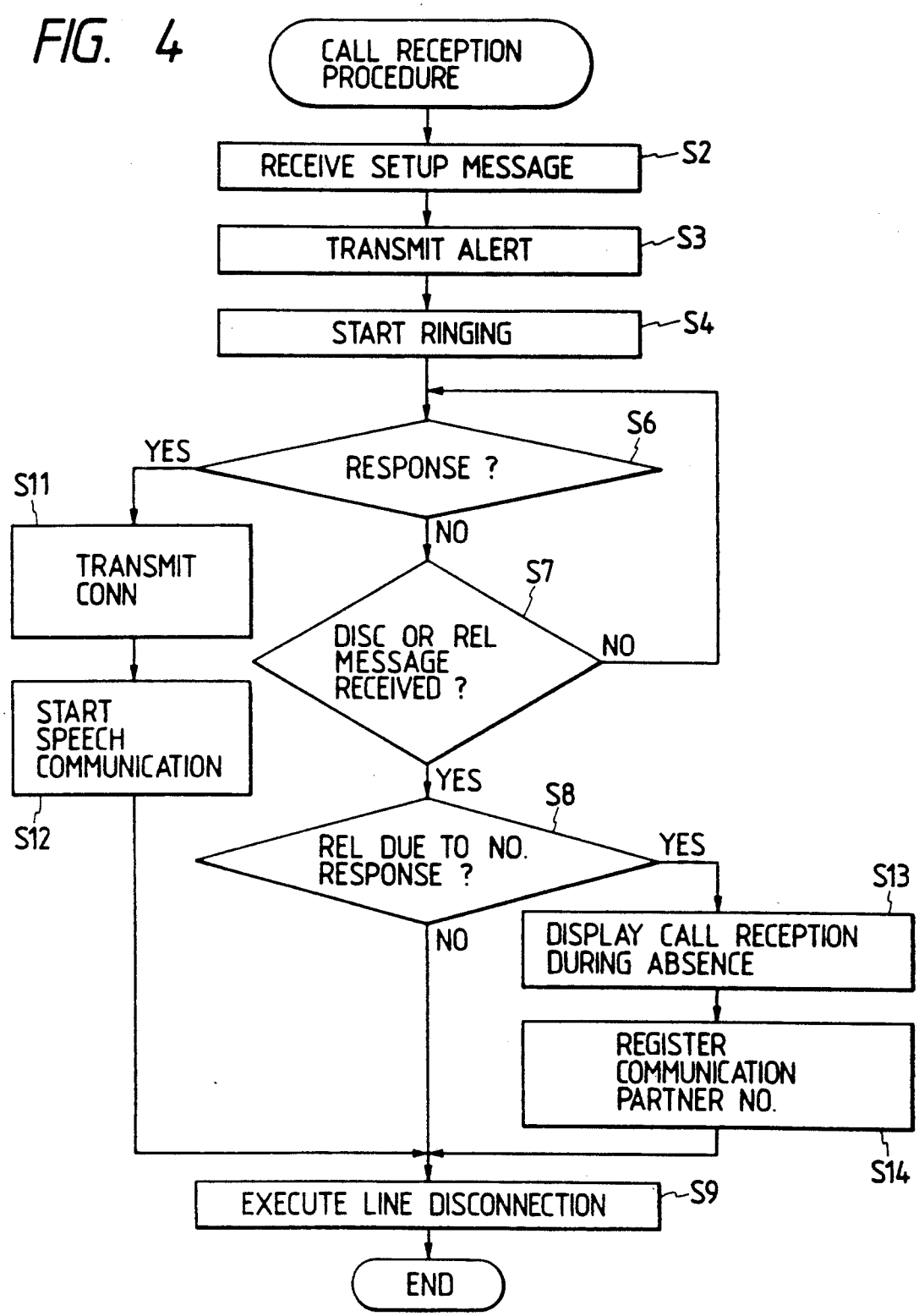
FIG. 4 is a flow chart showing the call reception procedure (or processing) according to the first embodiment.

The operator returning to the equipment installation site can recognize the message "call reception during absence" which was displayed at step S13 of FIG. 4.

Upon depression of a key in the operation key group 26, the following processes start.

First, upon detection of a depression of a key among the operation key group 26, it is checked at step S16 if the input key is a display key or not. If it is the display key, at step S17 the communication partner number stored at the call reception process is read from RAM 24 to display it on the display unit 29 so that the operator can know the communication partner which made the call.

If there were a plurality of calls during the absence, these communication partner numbers are also stored in RAM 24. Therefore, if communication partner numbers not displayed at step S22 are still in RAM 24, the control returns to step S16 to detect a depression of the display key. Each time the display key is depressed, the communication partner numbers are sequentially displayed. The communication partner numbers may be sequentially displayed at the timing of depressing the display key, e.g., every three seconds. Consequently, a plurality of communication partner numbers can be displayed sequentially using a single display key, thus allowing a simple arrangement of the equipment. In addition, the space occupied by the display unit can be minimized.

Alternatively, if the entered key is not the display key, the control advances to step S18 whereat it is checked if the entered key is a clear key. Upon detection of a depression of the clear key, the display "call reception during absence" having been displayed is erased at step S19. Then, at step S20 the stored communication partner numbers are deleted from RAM 24.

The calling party numbers may be deleted in the calling order.

If the depressed key is judged as not the clear key (e.g., judged as an off-hook key), then the control advances to step S21 to execute the necessary process.

As described above, according to this embodiment, it is possible to notify the fact that there was call reception during absence, and notify the identification of the communication partner.

If there were a number of call receptions during the absence, all the call receptions are registered so that the numbers of the calling party terminal equipments can be notified.

A display "call reception during absence" has been used in the above embodiment. However, the invention is not limited thereto, but a call reception notice may be made by turning on a lamp or the like.

In storing the communication partner number, not only the calling party number and sub-address but also the call reception time and other information may be stored.

Further, in the above embodiment a call reception during an operator absence has been judged based on the reason code at step S8 of FIG. 4. However, the message or the like received from the network may be used as the basis of such judgement in the similar manner as of the reason code.

Furthermore, in the above embodiment, although a digital telephone set has been used by way of example, the invention is not limited thereto but other equipment may also be used.

As described so far, according to the first embodiment, it is possible to know of a call reception during one's absence and know its identity.

Further, even if a plurality of call receptions were made during one's absence, they can be stored and displayed to notify one of the calling party terminal equipment numbers.

2nd Embodiment

In the first embodiment, a call release due to no response is detected based on the reason code contained in a call release message received from the network. In the second embodiment, a call release due to no response is judged if there is no response within a predetermined period after the start of ringing.

The control to be described in the following can be realized by the same structure as that shown in FIG. 2.

Figure 6:
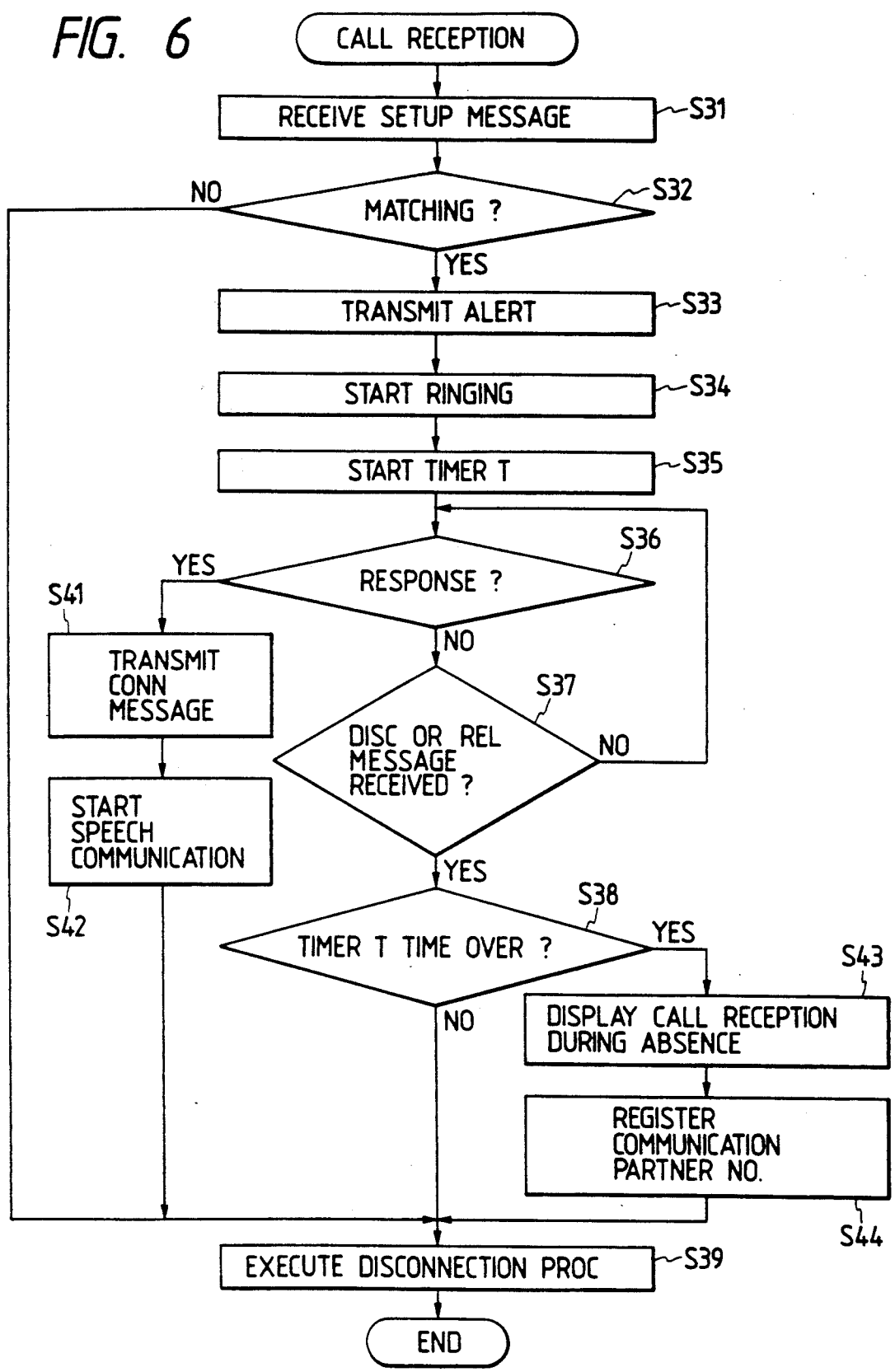
FIG. 6 is a flow chart showing the call reception procedure according to the second embodiment.

The call reception procedure of this embodiment will be described with reference to FIGS. 3 and 6. In the following description, it is assumed that a person A at a calling party telephone set A initiates a call request to a person B at a called party telephone set B.

When person A initiates a call to person B, person A takes the handset off the hook of the telephone set A to thereafter designate the call destination. Then, the telephone set B is selected and a setup command is sent via ISDN from telephone set A to telephone set B as indicates at 51 in FIG. 3. In this case, the processes at the telephone set B are as shown in FIG. 6.

First, at step S31 the setup message (indicated at 51 in FIG. 3) sent from the calling party telephone set A (terminal A) is received via the communication chip 27. At the next step S32, the integrity (matching) of the received setup message is checked. If there is no integrity, the control advances to step S39 whereat the communication chip 27 (FIG. 2) is instructed to cause the call disconnection process to be executed, to thereafter terminate the operation. This disconnection process is carried out, for example, by executing the sequence shown at DISC 56 to REL COM 58 steps shown in FIG. 3.

If there is an integrity of the setup message at step S32 and the setup message is allowed to be received, then the control advances to the processes at step S33 and following steps. Thereafter, the processes such as the sequence at ALERT 52 to BCH communication 55 steps are executed. First, at step S33 the ALERT message 52 is transmitted, and at the next step S34 a ringing sound is generated by driving a bell or the like to start calling an operator. At the same time, a call time supervising time T is made to start operating at step S35. Next, at steps S36 and S37, it is checked if the operator responds to the call by taking the handset 210 off the hook or a call release message such as a disconnection message is received from the network. If the I/O controller 26 detects an off-hook state of the handset 210 and hence a response by the operator, then the control advances from steps S36 to S41. At step S41 a CONNection message is transmitted to conduct the ordinary call processing operation at step S42, to thereby enter into a speech communication.

After completion of the speech, the control advances to step S39 to effect a disconnection process and terminate the operation.

Alternatively, if for example a call release message such as a DISConnection message is received at steps S36 and S37 whereat it is checked if the operator responds to the call by hooking off the handset 210 or if a call release message such as a DISConnection message is received from the network, then the control advances from step S37 to step S38. At step S38 it is checked if the call time supervising timer T started operating at step S35 has counted up or not. If not, the control advances to step S39 whereat a disconnection process is performed to terminate the operation.

If the timer T has counted up at step S38, the control advances to step S43. In this case, it is judged that an operator is not present at the telephone set and cannot respond to the call reception. At step S43 a message "call reception during absence" is displayed on the display unit 29. At the next step S44, the calling party number and sub-address contained in the received setup message at step S32 are picked up to store them in RAM 24 at the communication partner display area. At step S39, a disconnection process is performed to terminate the operation.

As described above, if an operator is not present at the time of call reception or if no response is received, a message "call reception during absence" is displayed on the display unit 29. Therefore, when the operator returns back to the telephone set installation site, the operator can recognize the display "call reception during absence" on the display unit 29 and know that there was a call during the absence.

Figure 5:
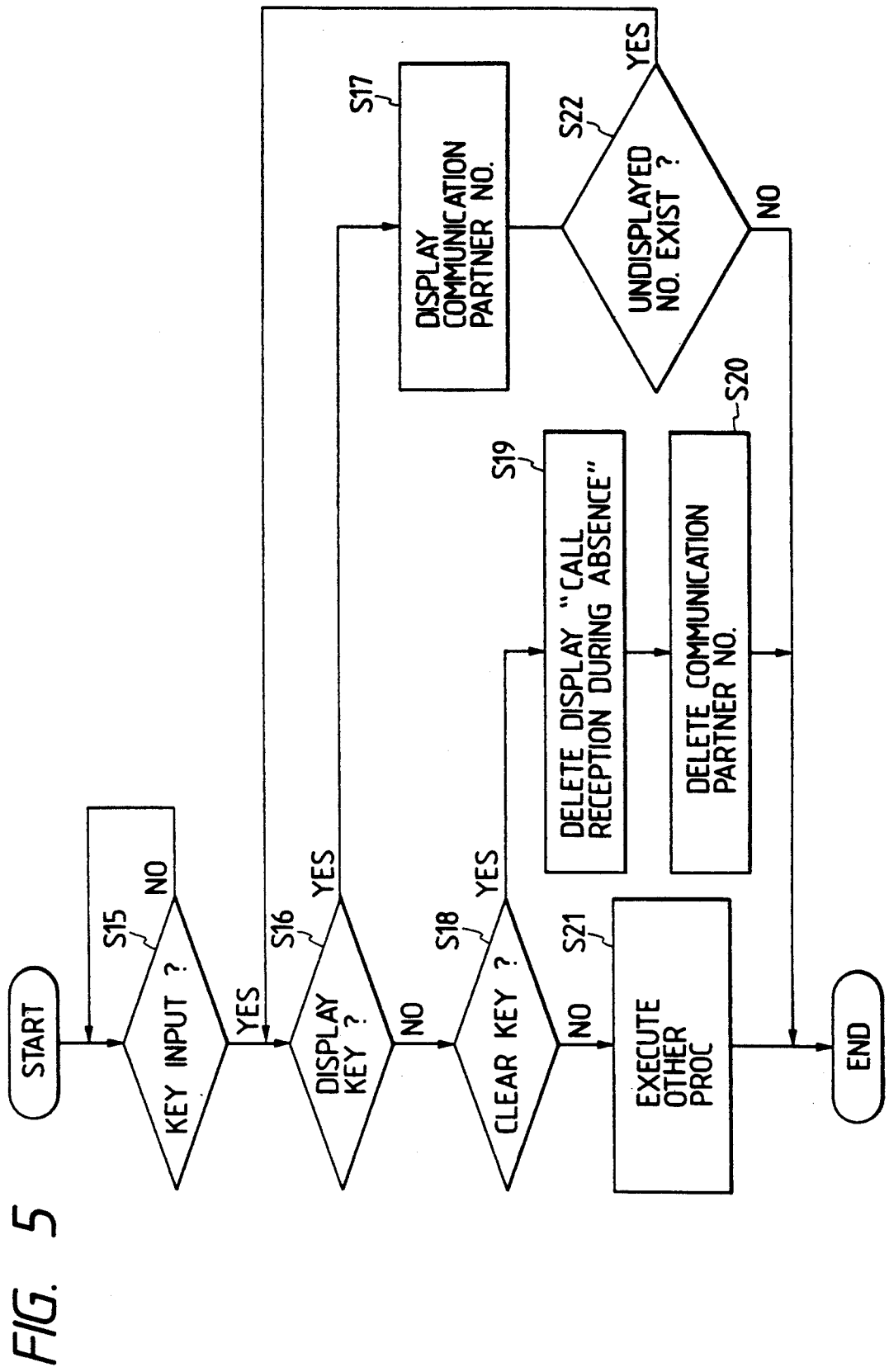
FIG. 5 is a flow chart showing the call reception confirmation procedure according to the first and second embodiments.

The processes executed when an operator is not present and cannot respond to a call are the same as described with FIG. 5, so a description therefore is omitted.

In the above embodiment, described is the case where the time during a call procedure is supervised and the call is maintained until a call release message is received from the network. However, another control may be used wherein a call is maintained for a predetermined period from the ringing start, and if there is no response from the operator within a predetermined period, then it is judged that the operator is not present, and so a call release message is sent from the called party telephone set to the network to disconnect the circuit.

In the above manner, it is possible to prevent reducing the network use efficiency caused by unnecessary calls for a long time.

According to the second embodiment, it is possible to know a call reception not responded to and the identification thereof. In addition, a call reception not responded to is detected by using a timer. Therefore, the structure of the equipment can be made more simple than the first embodiment which analyzes the reason code from the network.

3rd Embodiment

Next, the third embodiment will be described wherein an apparatus for data communication such as a facsimile apparatus is used, and if a call reception is not automatically received due to a local error or the like, a calling party number is notified.

Figure 7:
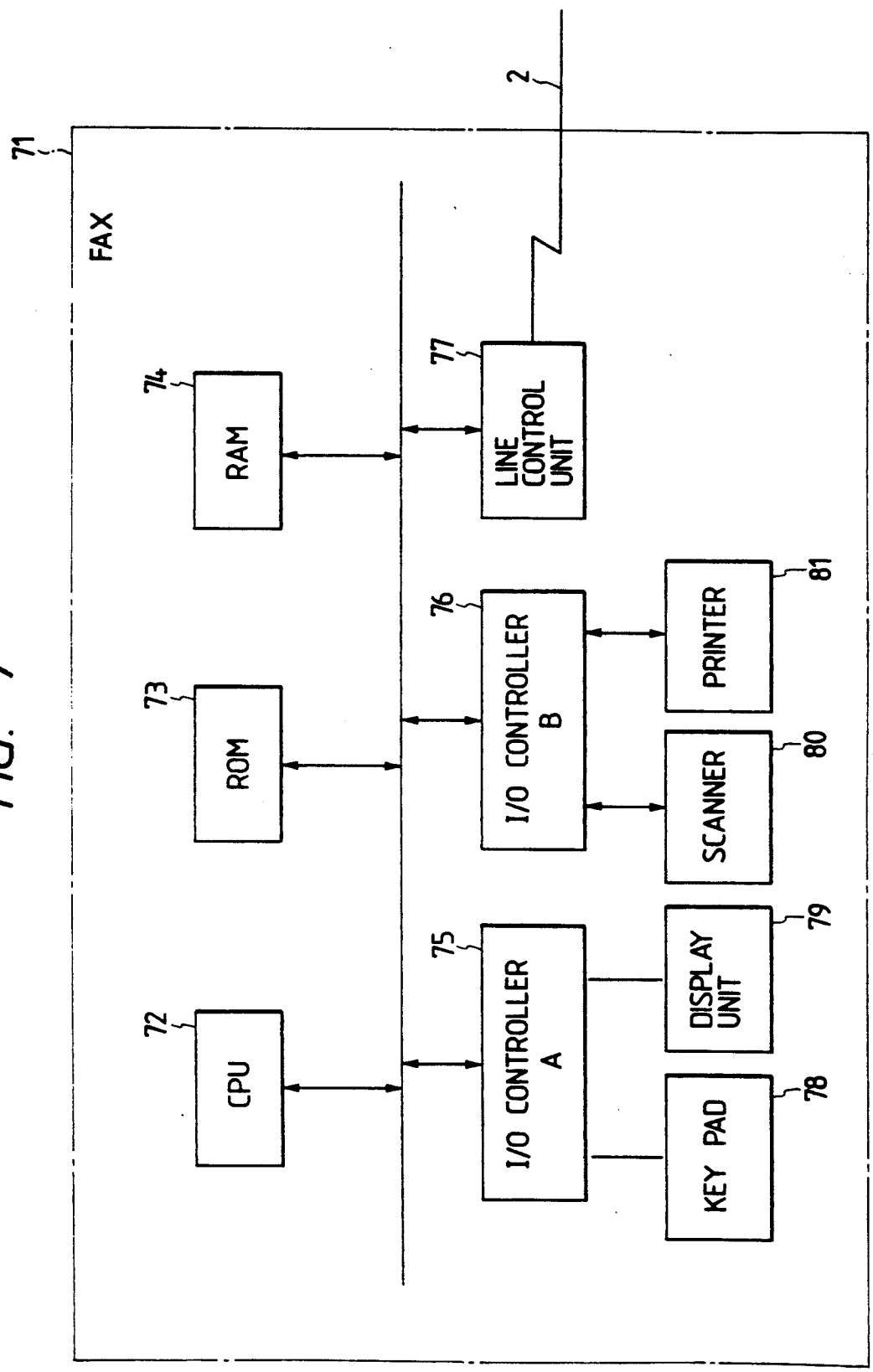
FIG. 7 is a detailed block diagram showing the facsimile apparatus of the third embodiment shown in FIG. 1.

FIG. 7 is a detailed block diagram showing the digital facsimile apparatus 4 in the system shown in FIG. 1.

Referring to FIG. 7, reference numeral 2 represents the ISDN circuit shown in FIG. 1, 71 denotes a digital facsimile apparatus, 72 denotes a central processing unit for controlling the entirety of the apparatus of this embodiment in accordance with programs shown in flow charts to be described later and stored in ROM 73, 74 denotes a RAM for storing transmission/reception data and the like, 75 denotes an I/O controller A for controlling a key pad 78 and display unit 79, the key pad being used for the input of various instructions to the apparatus, 76 denotes an I/O controller B for controlling a scanner 80 and a printer 81, the scanner being used for reading documents and the like and the printer being used for printing out reception data or the like, and 77 denotes a circuit (line) control unit.

The control executed by the apparatus constructed as above will be described with reference to FIGS. 3 and 8.

Figure 8:
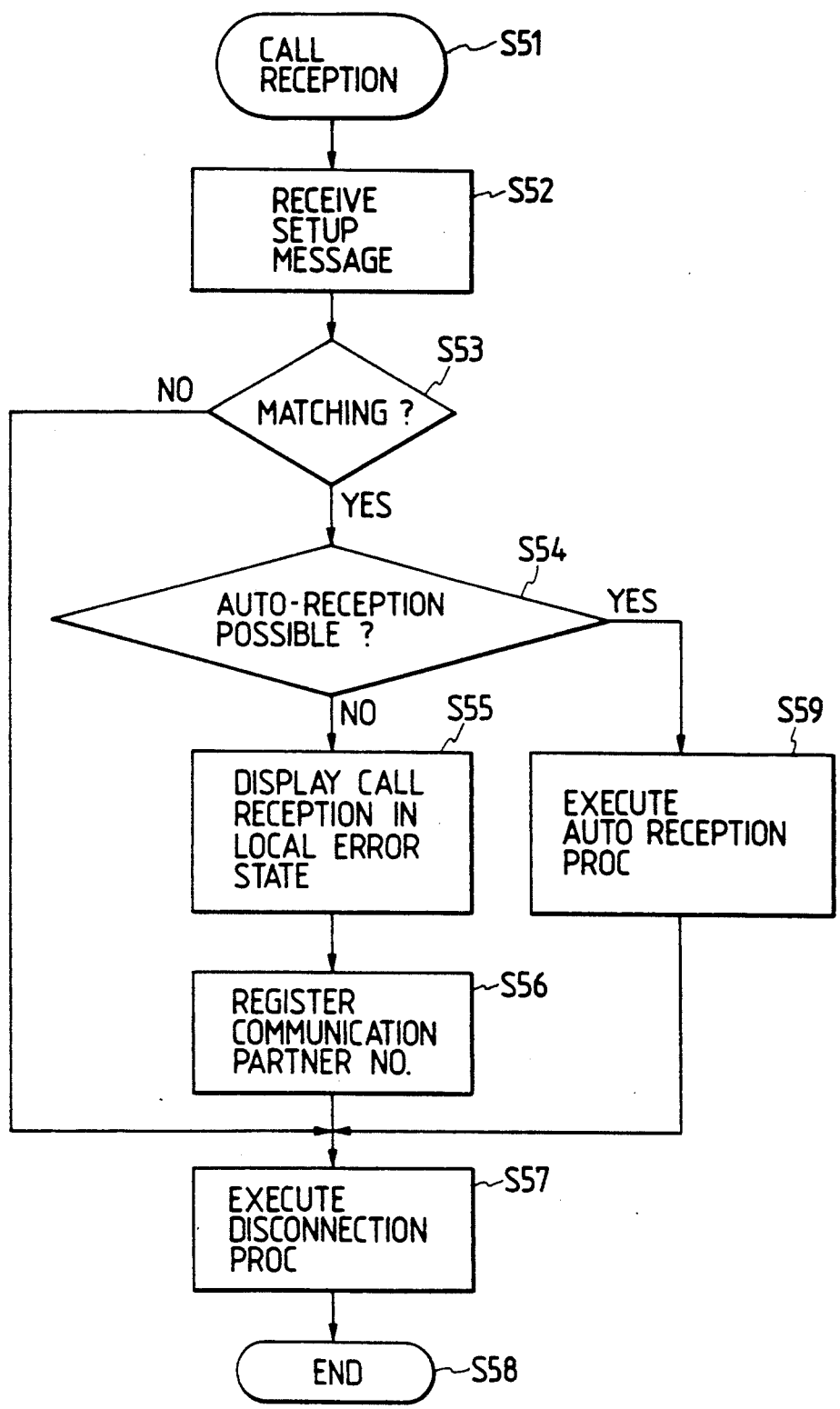
FIG. 8 is a flow chart showing the call reception procedure according to the third embodiment.

FIG. 8 is a flow chart showing a reception procedure executed by the apparatus of this embodiment.

First, the reception procedure will be described with reference to FIGS. 3 and 8. In this embodiment, it is assumed that terminal equipment A shown in FIG. 3 makes a call request to terminal equipment B.

The reception procedure executed by the digital facsimile apparatus 4 of this embodiment is performed in accordance with the flow chart shown in FIG. 8.

First, at step S52, a setup message (indicated at 51 in FIG. 3) sent from the calling party apparatus (terminal equipment A) is received via the circuit control unit 77. At the next step S53 the integrity of the received setup signal is checked. If there is no integrity, at step S57 the circuit control unit 77 is caused to execute a call disconnection process to terminate the operation. This disconnection process can be effected by executing, for example, the sequence from DISC 56 to REL COM 58 steps shown in FIG. 3.

If there is an integrity of the setup message at step S53, the information contained in the setup message is checked at step S54 to see if the setup message is allowed to be received (if an automatic reception is allowed). If affirmative, the automatic reception is conducted at step S59.

In this case, the sequence from ALERT 52 to B-CH communication 56 steps shown in FIG. 3 or the like sequence is executed to thereby receive facsimile data, store it in RAM, print it out to the printer 81, and perform like operations. The automatic reception is known in the art so that the detailed description thereof is omitted.

After the above processes, the control advances to step S57 whereat the circuit control unit 77 is caused to execute a disconnection process to terminate the operation. This disconnection process is effected, for example,,by executing the sequence from DISC 56 to REL COM 58 steps shown in FIG. 3.

If it is judged at step S54 that the automatic reception is not allowed in the case of a local error such as no recording sheet at the printer 81, full-state of reception data storage area of RAM 74, and the like), the control advances to step S55 whereat the I/O controller A 75 makes the display unit 79 display thereon a message "call reception during local error". At the next step S56, the calling party number and sub-address contained in the setup message received at step S52 are picked up and stored in RAM 74 at the predetermined area. At step S57 a disconnection process is performed to terminate the operation.

The call reception procedure is carried out in the above manner. If the automatic reception is allowed, facsimile information from the communication partner apparatus is automatically received, and printed out at the printer 81 or stored in RAM 74. If the automatic reception is not allowed, a notice to such effect is displayed on the display unit 79, and the calling party number and sub-address are stored in RAM 74 at the predetermined area.

As described above, if a call reception is not allowed to be automatically received, a message "call reception during local error" is displayed on the display unit 79. Therefore, even if the operator is not present at that time at the called party facsimile apparatus (terminal equipment B) site, the operator when returning to the installation site can recognize the message "call reception during local error" displayed on the display unit 79 and know that the call was not allowed to be automatically received.

Figure 9:
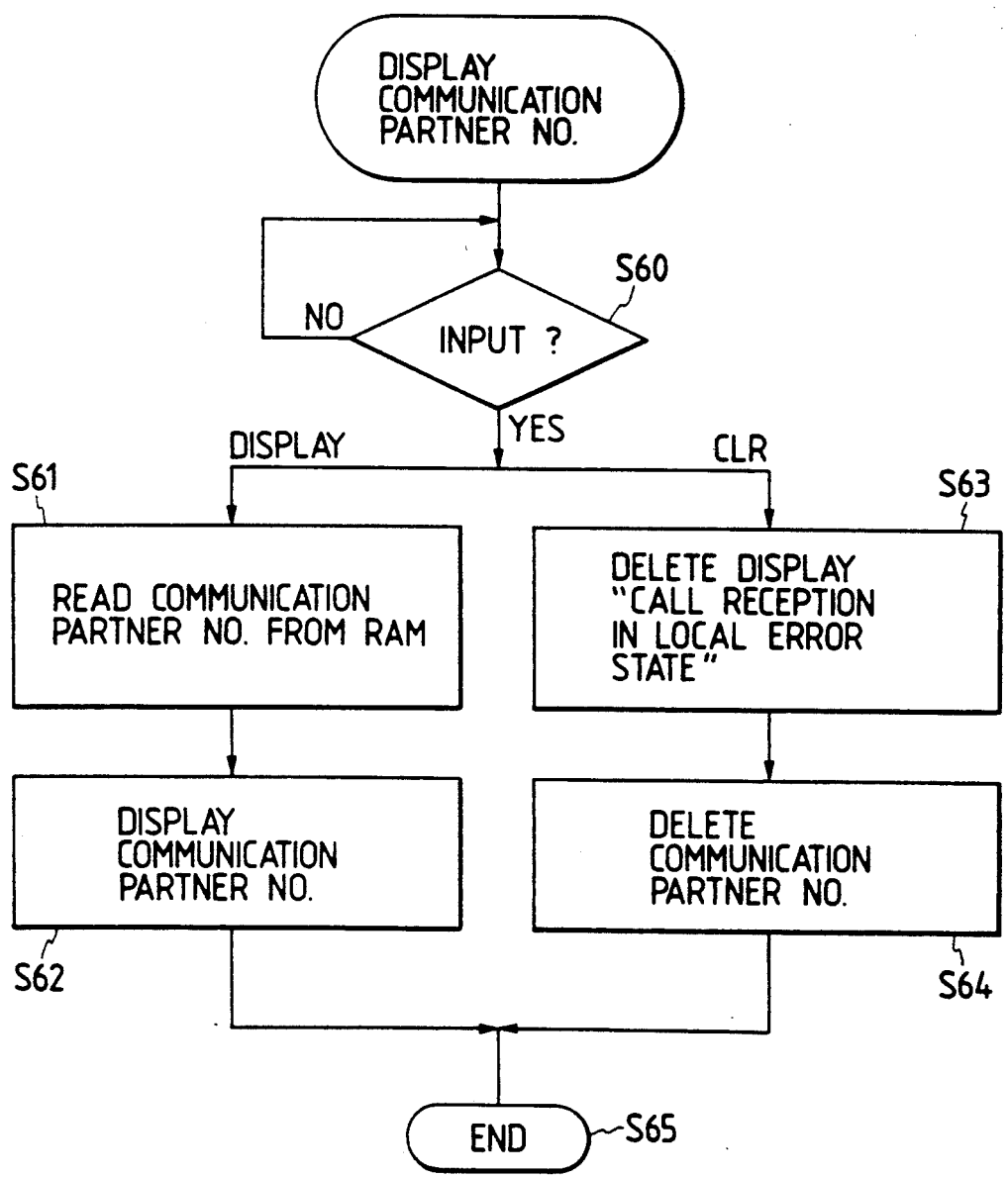
FIG. 9 is a flow chart showing the procedure of displaying a communication partner number upon reception of a call while a local error occurs, according to the third embodiment.

Next, the procedure for the case where the automatic reception was not allowed will be described with reference to FIG. 9.

In this case, after the recognition of the display "call reception during local error", it is first determined if some measure is to be carried out or not upon checking the calling party. If no measure is carried out, a clear key in the key pad 78 is entered, and if some measure is carried out, a display key is entered.

After execution of the disconnection process at step S57, the input of the key pad 78 is monitored at step S60. If the display key is entered, the control advances from step S60 to step S61 whereat the calling party number and sub-address stored in RAM 24 at step S56 are read out to display them on the display unit 79 at step S62, to thereby notify the communication partner not allowed to be automatically received. The operator can therefore identify the communication partner based on the calling party number so that the operator calls the communication partner to ask for re-transmitting the facsimile data. In this case, the display on the display unit 79 may be used only, or the display and the printed data on the printer 81 may be used together.

Alternatively, if a call was not allowed to be automatically received and no measure for this is not needed, the clear key in the key pad 78 is entered. In this case, the control advances from step S60 to step S63 whereat the display "call reception during local error" displayed on the display unit 79 is erased, and at the next step S64 the calling party number and address stored in RAM 24 at step S56 are deleted, to thereafter terminate the operation.

As described above, according to this embodiment, even if facsimile data from an important communication partner was not received, this fact can be recognized and the calling party can be identified, to thus allow proper measure for this case.

In addition, in the case where no measure is needed, unnecessary printing is not carried out and the display and registered data are deleted, to thus avoid unnecessary power consumption and ensure cost effectiveness.

In the above description of the third embodiment, the case where there are a plurality of call receptions during a local error in the equipment was not discussed. In such a case, the procedure shown in FIG. 8 is performed every time a call is received. Then, all the calling party numbers and sub-addresses stored in RAM 74 may be outputted upon an instruction from an operator.

Further, in the above description, the display "call reception during local error" is made on the display unit upon call reception during a local error. A lamp or the like may be used instead for notifying one of a call reception during a local error.

As described above, if a digital facsimile apparatus or the like assumes a local error state such as no recording sheet or a full-state of memory and receives a call, then this is notified and the calling party number and sub-address are stored. Therefore, an operator when returning to the installation site can know the call reception during a local error and can identify the communication partner, to thus allow proper measure for such a case and improve the operability of the apparatus.

4th Embodiment

In the first to third embodiments, a calling party number is displayed if a call is received while an operator is not present. In the fourth embodiment, there will be described a case where an automatic call is initiated based on the displayed calling party number.

The fourth embodiment will now be described in detail with reference to the accompanying drawings.

Figure 10:
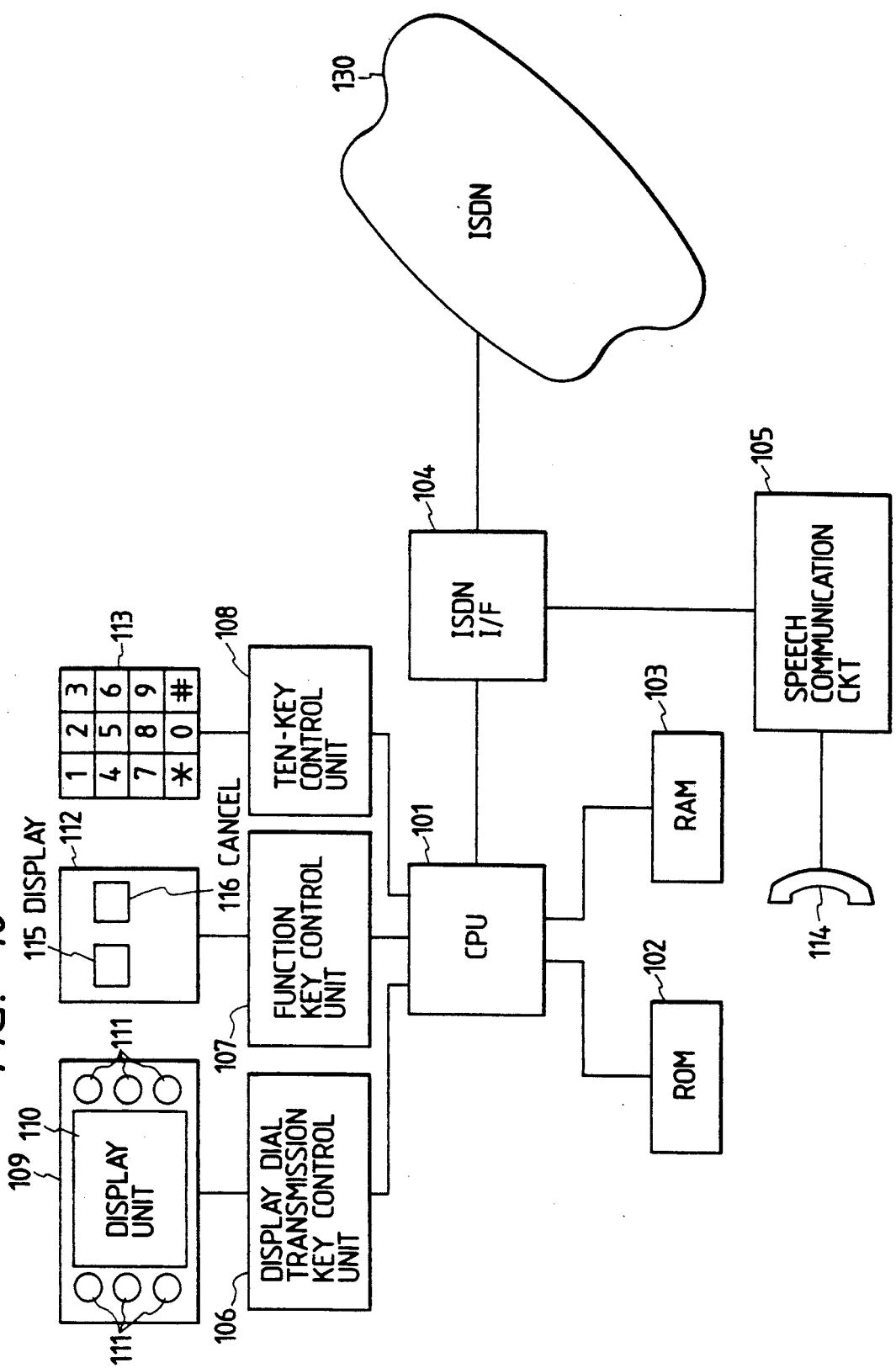
FIG. 10 is a block diagram showing a multifunction telephone set of fourth and fifth embodiments.

FIG. 10 is a block diagram showing a multifunction telephone set of the fourth embodiment of this invention. The multi-function telephone set of this embodiment is connected to ISDN 130.

In FIG. 10, reference numeral 101 represents a central processing unit (CPU) for controlling the entirety of the telephone set of this embodiment in accordance with programs as shown in the flow charts of FIGS. 12A, 12B and 6 stored in ROM 102 which also stores other parameters used in this embodiment, 103 a RAM for storing transmission/reception data and calling party number table to be described later, and the like, and 105 a speech communication circuit. The speech communication circuit 105 connected to a handset 114 converts a digital signal from an ISDN interface 104 into an analog signal which is sent to the handset 114, or converts an analog signal from the handset 114 into a digital signal which is sent to the ISDN interface 104.

A display/dial-transmission-key control unit 106 controls a display unit 110 and a dial-tansmission-key 111, a function key control unit 107 controls a function key 112, a ten-key control unit 108 controls a ten-key 113, a display panel 109 is equipped with a display unit 110 and the dial-transmission key 111, and a function panel 112 is equipped with a display key 115 and a cancel key 116. The ten-key 113 is used for inputting a communication partner number, and reference numeral 114 represents a handset.

Figure 11:
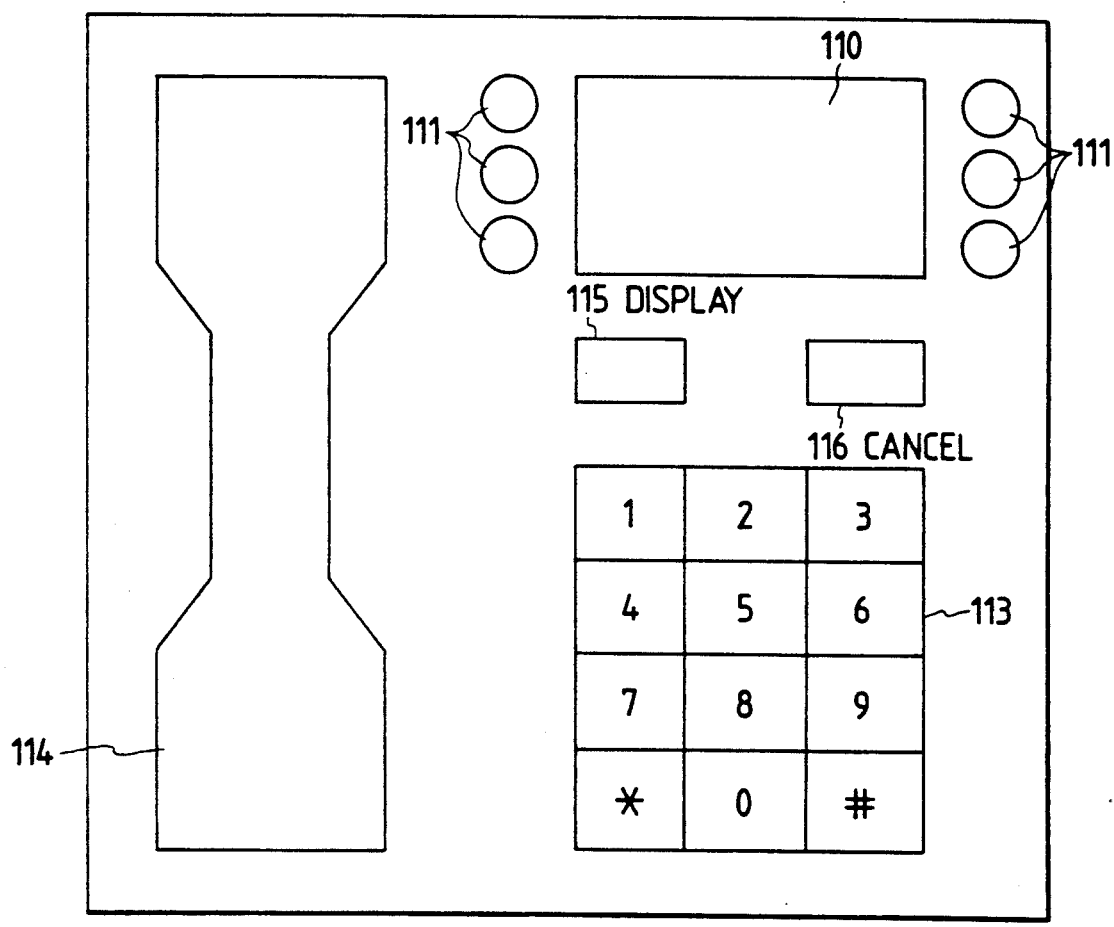
FIG. 11 is a plan view of the multi-function telephone set of the fourth and fifth embodiments shown in FIG. 10.

The plan view of the multi-function telephone set of this embodiment constructed as above is shown in FIG. 11 wherein like components to those in FIG. 10 are represented by identical reference numerals.

The operation of the multi-function telephone set or this embodiment constructed as above will be described with reference to the flow charts shown in FIGS. 12A and 12B.

First, at steps S101 to S103, it is checked if there is a call reception from ISDN 130, if there is a transmission request upon being taken off the hook of the handset 114, or if there is a key input.

When the handset 114 is taken off the hook, a transmission request is initiated and the control advances from step S102 to S104 whereat a transmission procedure is executed. In this case, an input of a calling party number from the ten-key 113 after the off-hook state of the handset 114 is waited, transmission to the communication partner identified by a communication partner number instructed from the ISDN interface is carried out, and a desired communication procedure is conducted in accordance with a response from the communication partner. The transmission procedure will be described later where an automatic transmission to the communication partner corresponding to a display on the display panel 109 is performed upon entering the dial-transmission-key 111 for the displayed number.

Figure 13:
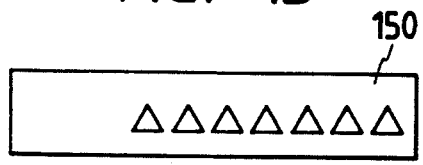
FIG. 13 is a diagram showing the storage area for a calling party number in RAM 103 of the fourth and fifth embodiments.

If a call reception is initiated from ISDN 130, a call reception command is sent therefrom. Therefore, this command is received at the ISDN interface 104 and sent to CPU 101 which analyzes it to judge the presence of a call reception so that the control advances from step S101 to step S105 whereat a ringing procedure is performed. At the same time, the calling party number (or transmitter number) contained in the call reception command received at step S106 is picked up and stored in RAM 103 at a predetermined area. The calling party number storage area in RAM 103 is an area wherein a single calling party number only is temporarily stored, as shown at 150 in FIG. 13.

At the next steps S107 and S108, the ringing state is maintained until the communication partner disconnects the call or takes the handset 114 off the hook. If the handset 114 is taken off the hook in response to the ringing, the control advances from step S108 to step S110 to perform a communication procedure relative to ISDN 130.

Alternatively, if there is no response during the ringing and the calling party abandons the communication to thus send a communication party disconnection signal and disconnect the call, then the control advances from step S107 to step S115. At step S115 a release procedure request is outputted to the ISDN interface 104 to perform the release procedure relative to ISDN 130. At the next step S116, it is checked if the calling party number saved at step S106 is registered in the calling party number table in RAM 103. If the number is being registered, the procedure is terminated to return to step S101.

Figure 14:
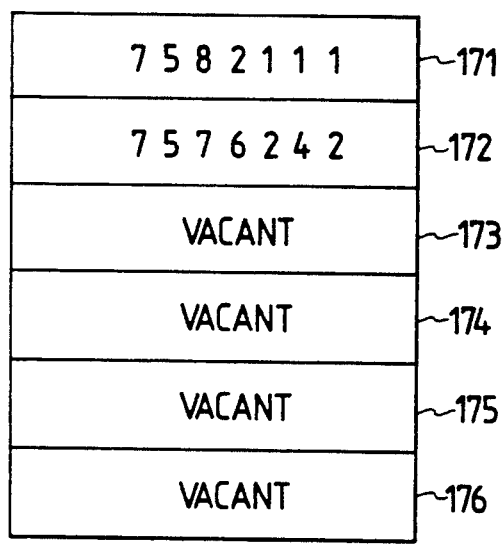
FIG. 14 shows a communication partner number table in RAM 103 of the fourth embodiment.

The calling party number table stores therein an abandoned calling party number and has the structure as shown in FIG. 14. In this embodiment, six calling party numbers 71 to 76 can be stored at a maximum.

If there is not stored a calling party number coincident with the received number, then the control advances from step S116 to step S117 whereat it is checked if there is a vacant area in the calling party number table. If there is no vacant area, the number cannot be stored so that the procedure is terminated.

Alternatively, if there is a vacant area, the control advances from step S117 to step S118 whereat the received calling party number (the contents in the memory 150 shown in FIG. 13) is stored in the vacant area to thereafter terminate the procedure.

If there is a key entry, the control advances from step S103 to S120 whereat it is checked if the input key is the display key 115 or not. If not, at step S121 it is checked if the input key is the delete key 116 or not. If not, the control advances to step S122 whereat it is cheked if the input key is the dial-transmission-key 111. If not, the key input is not correct so that it is neglected to return to step S101.

Figure 15:
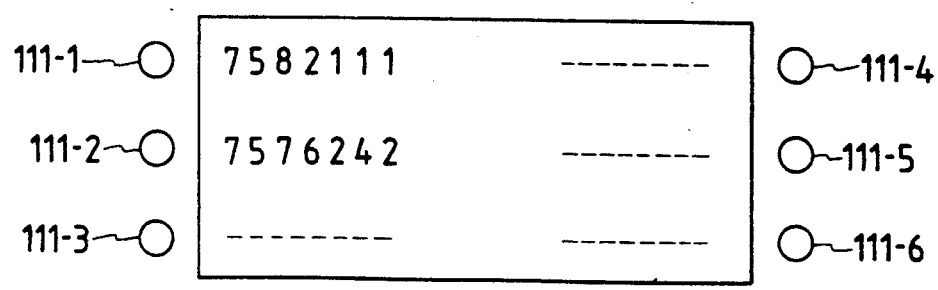
FIG. 15 shows a display example on a display unit of the fourth embodiment.

If the input key is the display key 115, the control advances from step S120 to step S125 whereat the display/dial-transmission-key control unit 10 is instructed to make the contents in the calling party number table of RAM 103 to be displayed on the display unit 110, to thereafter return to step S101. A display example of the display unit 110 is shown in FIG. 15. As seen from FIG. 15, all the contents in the calling party number table are displayed at the same time. In FIG. 15, the registered contents as shown in FIG. 14 are displayed.

If the input key is the dial-transmission-key 111, the control advances from step S122 to step S126 whereat it is checked if the handset 114 is being taken off the hook. If negative, the input key is not correct and neglected to return to step S101.

If the handset 114 is being taken off the hook, at step S127 the calling party number in the calling party number table corresponding to the inputted dial-transmission-key is identified and read out. Six dial-transmission-keys 111-1 to 111-6 are mounted at the positions, outside of the display area, corresponding to the six registered calling party number display areas on the display unit 110. Upon depression of any one of the dial-transmission-keys, the control advances from step S126 to S127 whereat the calling party number in the calling party number table corresponding to the inputted dial-transmission-key is identified and read out.

In this embodiment, the dial-transmission-key 111-1 shown in FIG. 15 corresponds to the calling party number 171, key 111-2 to number 172, key 111-3 to number 173, key 111-4 to number 174, key 111-5 to number 175, and key 111-6 to number 176.

At the next step S128 it is determined if the calling party number corresponding to the inputted dial-transmission-key is effective, that is, if the calling party number already registered has been selected or if the dial-transmission-key corresponding to the vacant area (173 to 176 in FIG. 15) has been depressed.

If the dial-transmission-key 111 corresponding to a vacant area is inputted, it is an incorrect key input so that the key input is regarded as invalid to thereafter return to step S101. If the calling party number corresponding to the inputted dial-transmission-key 111 is being registered (if effective), the control advances from step S128 to step S129 whereat the ISDN interface 104 is controlled to conduct a call procedure to ISDN 130 and send the calling party number read at step S130 to the connected ISDN 130, to thereby enter into a state of calling a desired communication party. At step S131, a response from the communication party is waited. If the communication party responds, a speech procedure is carried out at steps S132 and S133. After speech completion, a circuit release procedure is executed at step S134 to thereafter return to step S101. If the called party does not respond for a long time during the call procedure and the ringing is made to stop for interception of the call procedure, the handset 114 is on-hooked. Upon on-hook of the handset 114, the call procedure interception is immediately notified to the ISDN interface 104 via the speech communication circuit 105, to thereby execute the circuit release procedure.

If the inputted key is the delete key 116, the control advances from step S121 to step S140 whereat the dial-transmission-key 111 to be inputted next is waited. Upon input of the dial-transmission-key 111, at step S141 the calling party number table at the area corresponding to the inputted dial-transmission-key 111 is cleared. At step S142 the display/dial-transmission-key control unit 10 is caused to make the contents of the up-dated calling party number table to be displayed on the display unit 110.

As described so far, according to this embodiment, if an operator is not present and a call reception cannot be responded to, the received calling party number is stored and displayed. Therefore, the calling party can be identified and proper measure can be made smoothly.

Further, there is provided a one-to-one correspondence between the dial-transmission-keys 111 and the calling party numbers in the calling party number table. Therefore, while displaying the calling party numbers, the dial-transmission-key 111 corresponding to the displayed calling number can be entered to readily call the calling party at once.

In this embodiment, all the stored calling party numbers are displayed on the display unit 110. The numbers may be sequentially displayed in accordance with the number of depressions of the display key 115 or in accordance with the time duration of depression. Without providing a plurality of dial-transmission-keys 111, only a single dial-transmission-key may be used to enter a displayed calling party numbers.

5th Embodiment

Next, the fifth embodiment will be described which is a modification of the fourth embodiment.

Figure 12A:
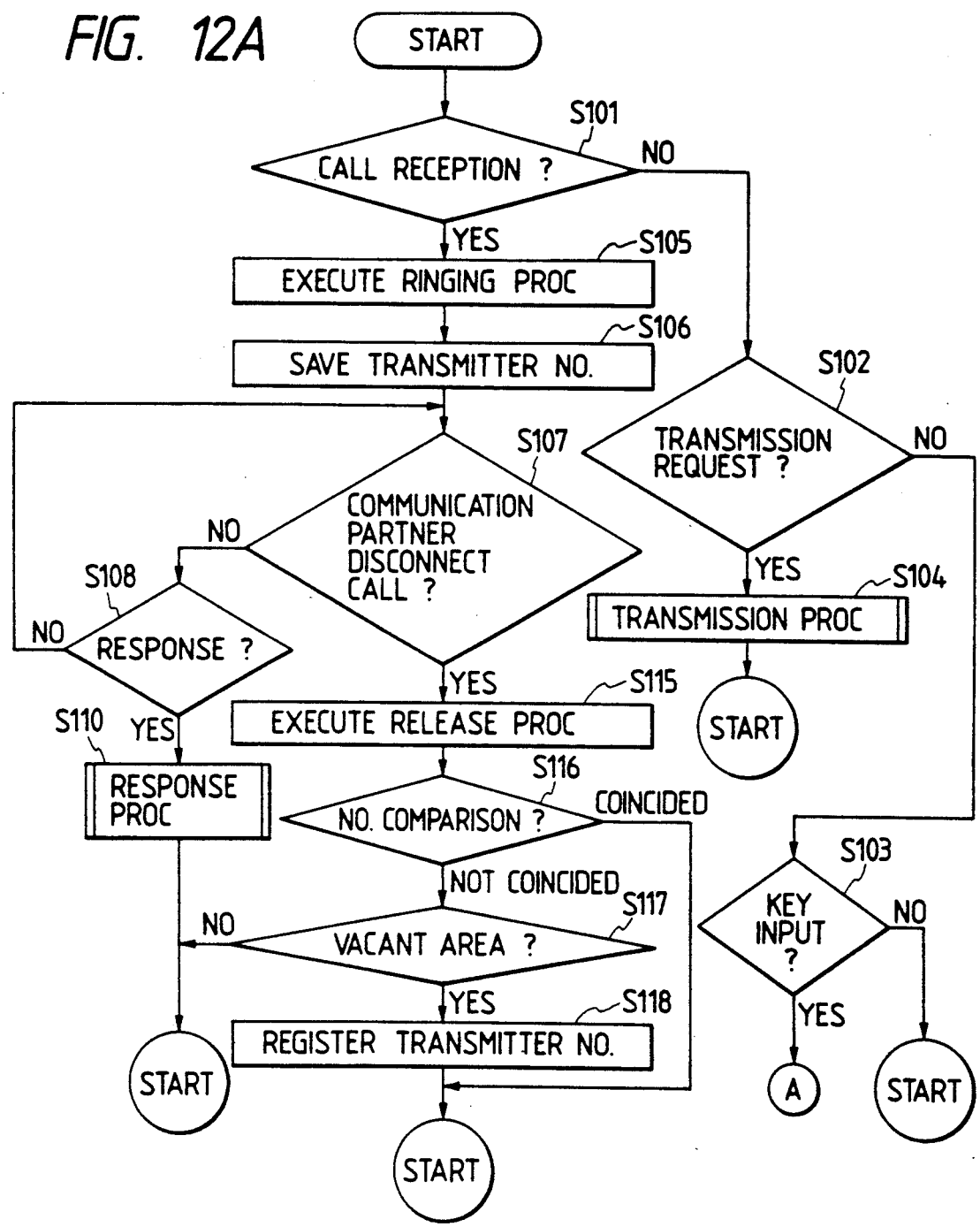
FIGS. 12A and 12B are flow charts showing the operation according to the fourth embodiment.
Figure 12B:
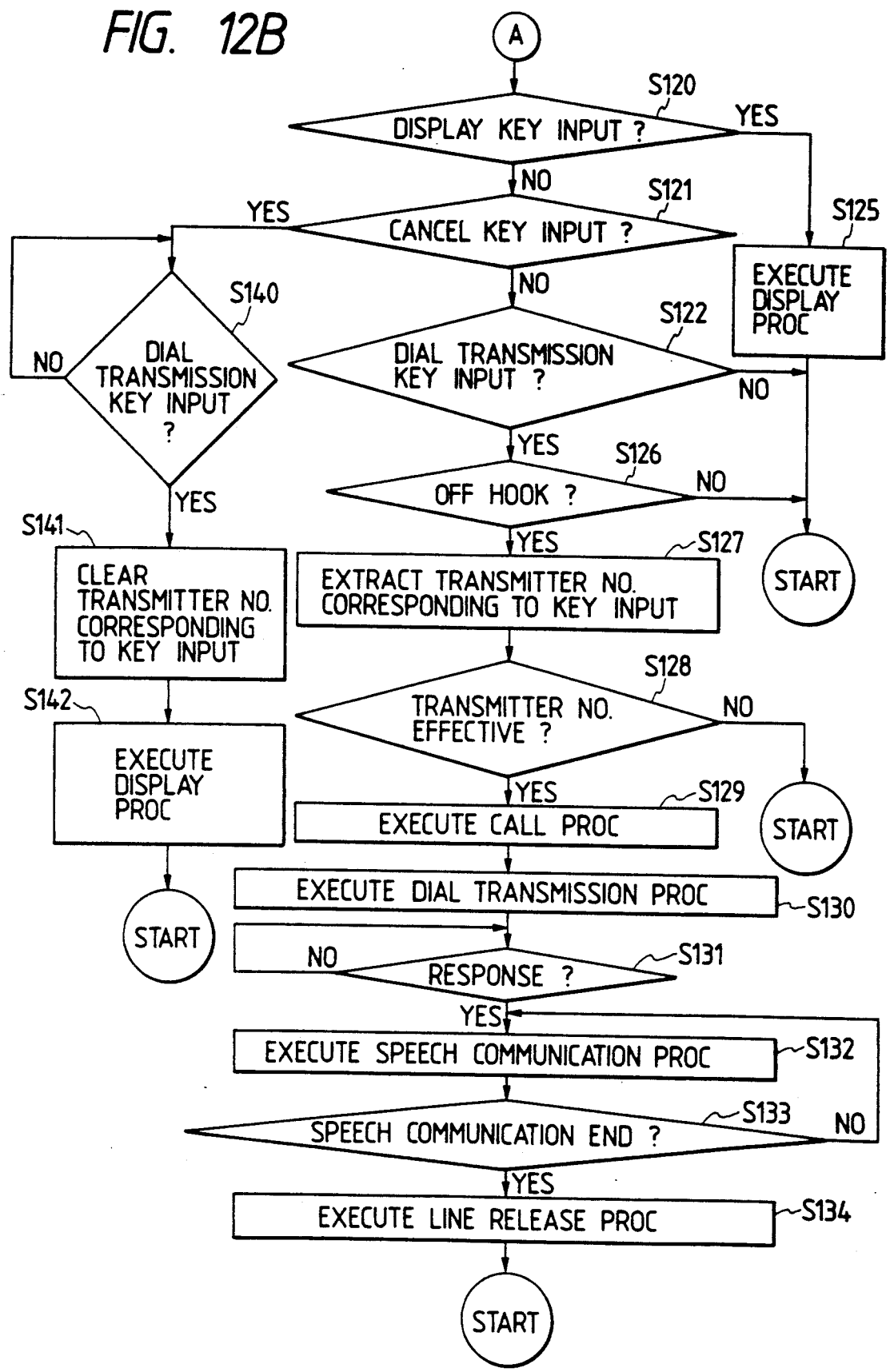
Figure 16:
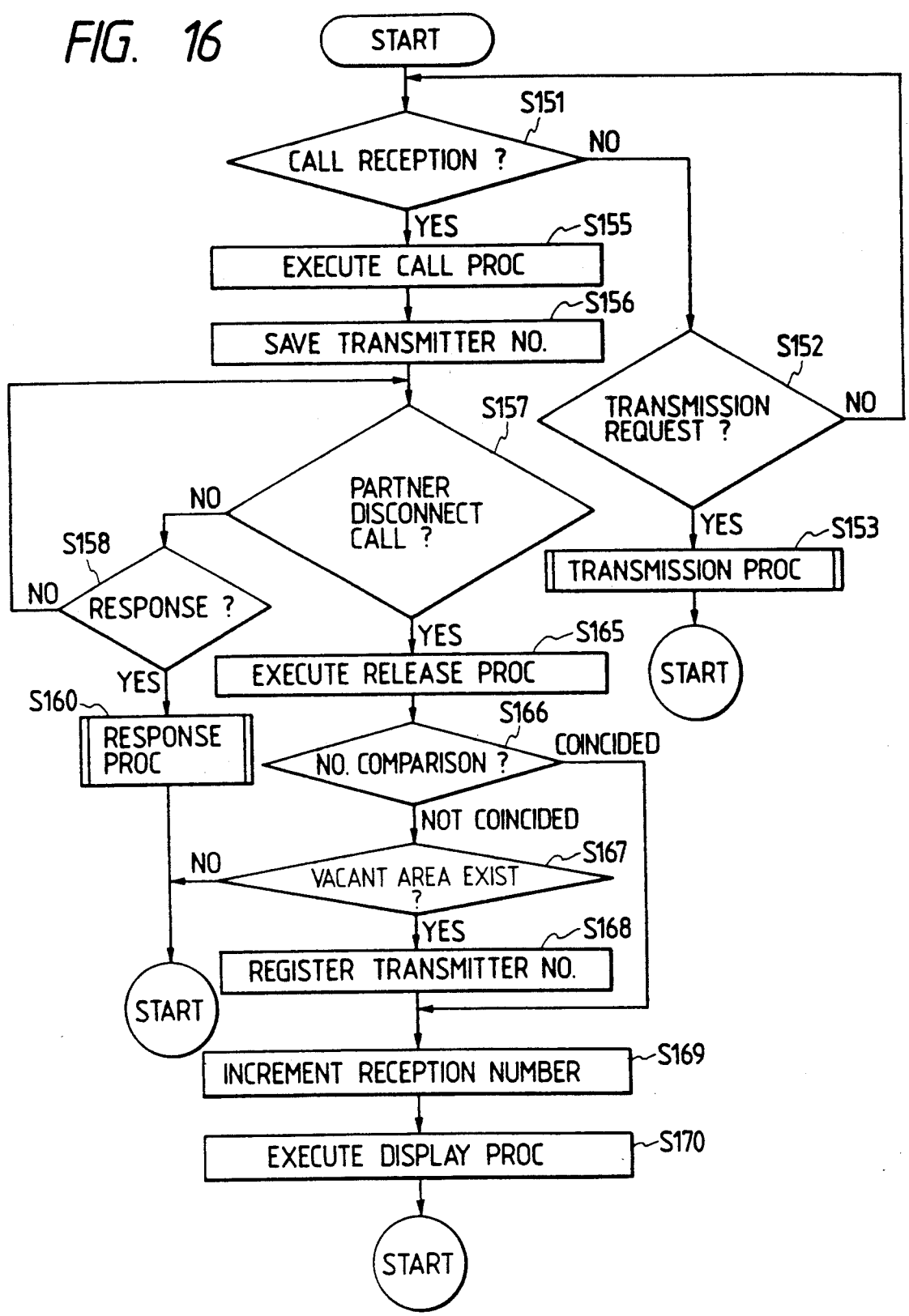
FIG. 16 is a flow chart showing the operation according to the fifth embodiment.

FIG. 16 is a flow chart a part of which is a modification of the flow chart shown in FIG. 12A. The flow chart shown in FIG. 16 is executed under control of CPU 101 shown in FIG. 10.

Generally, it is checked at steps S151 and S152 if there is a call reception from ISDN 130 or if there is a transmission request upon off-hook of the handset 114.

If the handset 114 is taken off the hook, the transmission request is initiated so that the control advances from step S152 to step S153 whereat a transmission procedure is carried out, At step S153 an input of a calling party number from the ten-key 113 or the dial-transmission-key 111 after the off-hook of the handset 114 is waited, transmission to the communication partner identified by a communication partner number instructed from the ISDN interface 104 is carried out, and a desired communication procedure is conducted in a accordance with a response from the communication partner. In this case, if there is a call reception to be described later and no response thereto, and if transmission to the communication partner having the calling party number stored in RAM 103 is conducted, the dial-transmission-key 111 corresponding to the display on the display unit 109 is entered to effect an automatic transmission procedure to the communication partner corresponding to the display.

If a call reception is initiated from ISDN 130, a call reception command is sent therefrom. Therefore, this command is received at the ISDN interface 104 and sent to CPU 101 which analyzes it in order to judge if there is a presence of a call reception. Then, the control advances from step S151 to step S155 whereat a ringing procedure is performed. At the same time, the calling party number contained in the call reception command received at step S156 is picked up and stored in RAM 103 at a predetermined area. The calling party number storage area in RAM 103 is an area wherein a single calling party number only is temporarily stored, as shown at 150 in FIG. 13.

At the next steps S157 and S158, the ringing state is maintained until the communication partner disconnects the call or the handset 114 is taken off the hook. If the handset 114 is taken off the hook in response to the ringing, the control advances from step S158 to step S160 to perform a communication procedure relative to ISDN 130.

Alternatively, if there is no response during the ringing, and if the calling party abandons the communication and sends a communication party disconnection signal to disconnect the call, then the control advances from step S157 to step S165. At step S165 a release procedure request is outputted to the ISDN interface 104 to perform the release procedure relative to ISDN 130. At the next step S166, it is checked if the calling party number saved at step S166 is registered in the calling party number table in RAM 103. If the number is being registered, the control advances to step S169.

The calling party number table stores therein an abandoned calling party number and the number of call receptions from the abandoned calling party in one-to-one correspondence to each other and has the structure as shown in FIG. 17. In FIG. 17, reference numerals 151 to 156 represent the calling party number storage areas, and 157 to 162 represent the call reception number storage areas. The calling party number storage area 151 corresponds to the call reception number storage area 157, and so on. The call reception number storage areas 157 to 162 each are set at "0" at the initial condition where no calling party number is registered.

If there is not searched a coincident calling party number, the control advances from step S166 to step S167 whereat it is checked if there is a vacant area of the calling party number storage area in the calling party number table. If there is no vacant area, the procedure terminates.

Alternatively, if there is a vacant area, the control advances from step S167 to step S168 whereat the received calling party number (the contents in the memory 150 shown in FIG. 13) is stored in the vacant area among the calling number storage areas 151 to 156 to thereafter advance to step S169.

At step S169, the number of call receptions for the received calling party number stored in the calling party number table is incremented by 1 to thereafter advance to step S170 whereat the contents of the calling party number table are displayed on the display unit 110 under control of the display/dial-transmission-key control unit 106. At step S168 and/or step S170, the contents of the up-dated calling party number table are displayed.

A display example on the display unit 110 is shown in FIG. 18. As seen from FIG. 18, all the contents registered in the calling party number table are displayed at once. In FIG. 18, the registered contents as shown in FIG. 17 are shown by way of example. Six dial-transmission keys 111 are mounted at the positions, outside of the display area, corresponding to the six registered calling party number display areas on the display unit. Upon depression of any one of the dial-transmission-keys, at the transmission procedure step S153 the calling party number is read from the calling party number table to effect a transmission to the calling party at once.

As described so far, according to this embodiment, if an operator is not present and a call reception cannot be responded to, the received calling party number together with the number of call receptions from the concerned calling party can be stored and displayed. Therefore, the call reception number from a same calling party can be recognized. Based on the call reception number, it can be determined if the call is required to be responded quickly, to thus allow proper measure for that call smoothly.

Further, there is provided a one-to-one correspondence between the dial-transmission-keys 111 and the calling party numbers in the calling party number table. Therefore, while displaying the calling party numbers, the dial-transmission-key 111 corresponding to the displayed calling number can be entered to readily call the calling party at once.

In the above-described first to fifth embodiments, the calling party number is displayed. A calling party name may also be displayed by previously storing calling party names in RAM in correspondence with calling party numbers. For example, in the fourth embodiment, names corresponding to calling party numbers are stored in RAM 103 as shown in FIG. 19. Therefore, when a call is received during absence, the name is searched based on the number information and displayed. This procedure is carried out at step S125 shown in FIG. 12. A display example is shown in FIG. 20. An operator can therefore readily identify the calling party during his absence.

Further, in the above embodiments, a telephone set and facsimile apparatus have been used as communication terminal equipments. The invention is also applicable to other communication apparatus such as telex apparatus and the like.

The present invention has been described with reference to the preferred embodiments. The invention is not intended to be limited to the above embodiments only, but various modifications are possible without departing from the scope of the appended claims.

We claim:

1. A communication apparatus which is connected to a communication line, comprising:
   reception means for receiving discrimination information which is to discriminate a calling party equipment, upon a call reception, the discrimination information being sent from said calling party equipment via the communication line;
   first determining means for determining whether a call from the calling party equipment is responded to;
   second determining means for determining whether a disconnection request command from the communication line is received;
   memory means for storing the discrimination information received via the communication line by said reception means if said first determining means determines that the call from the calling party equipment is not responded to and said second determining means determines that the disconnection request command from the communication line is received; and output means for visually outputting the discrimination information stored in said memory means, in accordance with a key input operation.

2. A communication apparatus according to claim 1, wherein said reception means receives a dial number of said calling party equipment as said discrimination information.

3. A communication apparatus according to claim 2, further comprising count means for counting a number of the call reception for each dial number of the calling party equipment, and wherein said output means visually outputs the call reception number counted by said count means together with the corresponding dial number.

4. A communication apparatus according to claim 1, further comprising automatic calling means for reading said information stored in said memory means and automatically calling said calling party equipment.

5. A communication apparatus according to claim 1, wherein said memory means stores said discrimination information for a plurality of calling party equipments which do not respond to a call reception.

6. A communication apparatus according to claim 5, wherein said output means sequentially and visually outputs said discrimination information for said plurality of calling party equipments in response to a depression of a single manual switch.

7. A communication apparatus according to claim 4, wherein said automatic calling means performs an automatic call in response to a depression of a one-touch dial key.

8. A communication apparatus according to claim 1, further comprising means for deleting said information stored in said memory means.

9. A communication apparatus according to claim 1, wherein said communication apparatus is a facsimile apparatus connected to ISDN.

10. A communication apparatus according to claim 1, wherein said communication apparatus is a telephone set connected to ISDN.

11. A communication apparatus which is connected to a communication line, comprising:

determining means for determining whether a call reception from a communication network is responded to;

memory means for storing calling party information which has been sent via the communication line from a calling party equipment upon the call reception, if said determining means determines that the call reception is not responded to;

display means for displaying information associated with the calling party information stored in said memory means; and calling means for calling the calling party equipment after the display by said display means, in response to an entry of a predetermined key.

12. A communication apparatus according to claim 11, wherein said memory means stores information on a plurality of calling parties which do not respond to said call reception.

13. A communication apparatus according to claim 12, wherein said display means displays information associated with said information on said plurality of calling parties stored in said memory means.

14. A communication apparatus according to claim 12, further comprising means for selecting said information on one of said plurality of calling parties stored in said memory means, wherein said calling means initiates a call to said selected calling party.

15. A communication apparatus according to claim 11, wherein said display means displays name information corresponding to said information on said calling party stored in said memory means.

16. A data communication apparatus which is connected to a communication system in which a plurality of terminal equipment are connected to at least one circuit, comprising:

detecting means for detecting a call reception from the connected circuit;

determining means for determining whether automatic reception of data sent from a calling party is possible or impossible, subsequent to detection of the call reception by said detecting means;

storing means for storing a calling party number of the calling party, the automatic reception of the data sent from the calling party being determined to be impossible by said determining means;

means for rejecting the call reception to said apparatus if said determining means determines that the automatic reception is impossible; and notifying means for notifying the calling party, the calling party number of which is stored in said storing means.

17. A data communication apparatus according to claim 16, wherein said data communication apparatus is a facsimile apparatus for image information communication.

18. A data communication apparatus according to claim 16, wherein said notifying means displays said calling party number.

* * * * *

UNITED STATES PATENT AND TRADEMARK OFFICE
CERTIFICATE OF CORRECTION

PATENT NO. : 5,245,651
DATED : September 14, 1993
INVENTOR(S) : SHOICHI TAKASHIMA, ET AL.

Page 1 of 2

It is certified that error appears in the above-identified patent and that said Letters Patent is hereby corrected as shown below:

COLUMN 2

Line 24, "its" should be deleted.

COLUMN 5

Line 59, "cates" should read --cated--.

COLUMN 8

Line 14, "like)," should read --like,--.
Line 66, "not" should be deleted.

COLUMN 10

Line 15, "being taken off the hook of" should be deleted.
Line 16, "114," should read --114 being taken off the hook,--.

COLUMN 11

Line 22, "unit 10" should read --unit 110--.

COLUMN 12

Line 20, "unit 10" should read --unit 110--.

COLUMN 13

Line 33, "step S166" should read --step S156--.

UNITED STATES PATENT AND TRADEMARK OFFICE
CERTIFICATE OF CORRECTION

PATENT NO. : 5,245,651
DATED : September 14, 1993
INVENTOR(S) : SHOICHI TAKASHIMA, ET AL.

It is certified that error appears in the above-identified patent and that said Letters Patent is hereby corrected as shown below:

COLUMN 14

Line 21, "responded" should read --responded to--.

COLUMN 16

Line 41, "means" should read --rejecting means--.

Signed and Sealed this

Twenty-sixth Day of April, 1994

*Attest:*

BRUCE LEHMAN

*Attesting Officer*    Commissioner of Patents and Trademarks